Aug. 20, 1929.　　　　M. F. CARR　　　　1,725,178

LUBRICANT NIPPLE

Filed Aug. 25, 1925

Inventor:
Moses F. Carr,
by Emery Booth Janney & Varney
Attys

Patented Aug. 20, 1929.

1,725,178

UNITED STATES PATENT OFFICE.

MOSES F. CARR, OF LEXINGTON, MASSACHUSETTS, ASSIGNOR, BY MESNE ASSIGNMENTS, TO ALEMITE CORPORATION, OF CHICAGO, ILLINOIS, A CORPORATION OF DELAWARE.

LUBRICANT NIPPLE.

Application filed August 25, 1925. Serial No. 52,324.

This invention aims to provide an improved lubricant receiving nipple.

In the drawings which illustrate a preferred embodiment of my invention:—

Figure 1:
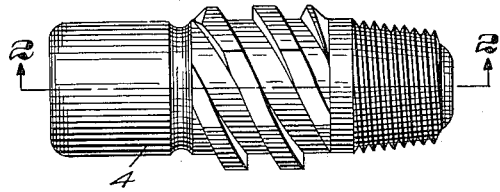
Figure 1 is a side elevation of a lubricant receiving nipple.

Referring to the drawings I have shown a lubricant receiving nipple which is particularly useful as a nipple for water pumps and the like, but may be used at any bearing which requires lubrication.

Heretofore nipples, of the general type illustrated, were provided with one or more ball-check valves to prevent leakage from the nipple. While such nipples have been quite satisfactory it has been found that occasionally the ball would not rest properly and therefore leakage would occur. To remedy this I have provided the nipple with a flat valve 1 which is formed from two pieces of material preferably secured together by cement or in any other suitable manner.

Figure 4:
Fig. 4 is a section through a strip from which the valves, used in the nipples, are cut.
Figure 5:
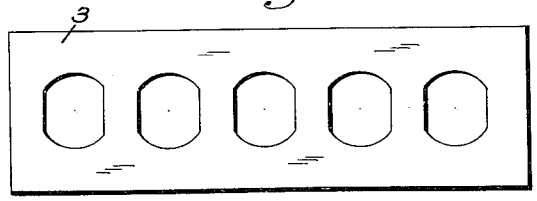
Fig. 5 is a plan view of a strip after a plurality of valves have been stamped therefrom.

The valve may be stamped from strips of material which have been secured together as illustrated in Figs. 4 and 5. Each valve is formed with a flexible compressible part 2, which may be leather, rubber or the like and a rigid part 3 which may be metal.

The nipple body 4 is generally like the nipple more fully illustrated and described in the pending application to Howard J. Murphy, Serial No. 8,586, but may be of any other suitable construction according to the lubricant expelling device with which it is to cooperate.

Figure 2:
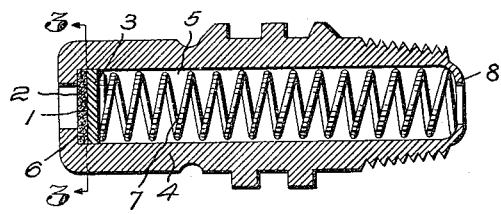
Fig. 2 is a section on the line 2—2 of Fig. 1, being partly in elevation.
Figure 3:
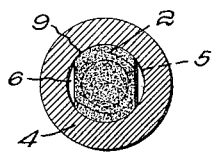
Fig. 3 is a section on the line 3—3 of Fig. 2.

In the nipple illustrated in Figs. 1, 2 and 3 I have provided a lubricant passage 5 through the axis thereof and an annular shoulder 6 adjacent to the outer end of the nipple to provide a seat for the valve. Thus when the parts of the nipple are assembled the compressible part 2 of the valve is pressed tightly against the shoulder 6 by a spring 7 one end of which seats against the metal part 3 of the valve, while the other end seats against a flange 8 rolled inwardly after the spring has been inserted in the passage 5 as best illustrated in Fig. 2.

The valve (Fig. 3) has opposed edge portions 9 bearing against the wall of the passage 5 to guide in during reciprocation while other opposed edges are flat and spaced away from the wall to permit free passage of lubricant around the valve when opened.

When lubricant is not being forced to the bearing, through the nipple, the valve covers the smaller portion of the passage 5 (Fig. 3) and the flexible part 2 is pressed so tightly against the shoulder or valve seat 6 that a tight seal is provided thereby preventing leakage.

While I have shown and described a preferred embodiment of my invention it will be understood that changes involving omission, substitution, alteration and reversal of parts and even changes in the mode of operation may be made without departing from the scope of my invention which is best defined in the following claims.

Claims:

1. A lubricant receiving nipple having a lubricant passage therethrough, an annular shoulder surrounding said passage adjacent to the outer end of said nipple to provide a valve seat, a flat valve and a spring normally urging said valve against said shoulder, said valve formed from a relatively thin compressible part back supported by a thin flat rigid part against which said spring is seated, said valve parts bearing against a portion of the wall of said passage beyond said shoulder and spaced away from the remainder of the wall to permit free passage of lubricant through said passage when the valve is opened.

2. A lubricant receiving nipple having a lubricant passage therethrough, an annular shoulder surrounding said passage adjacent to the outer end of said nipple to provide a valve seat, a flat valve and a spring normally urging said valve against said shoulder, said valve formed from a relatively thin compressible part back supported by a rigid flat disc against which said spring is seated, and said valve having opposed edges bearing against the wall of said passage to guide said valve and opposed edges spaced away from said wall to permit lubricant to pass said valve when opened.

3. A lubricant receiving nipple including a cylindrical passageway through said nipple, a thin disk-like valve having portions engaging the walls of said cylindrical passageway and having one or more flat edges to permit passage of lubricant by the valve when opened and a spring having one end seated against said valve to hold said valve in a position normally preventing leakage from said nipple.

4. As an article of manufacture, a valve disc comprising an irregularly shaped plane leather disc in registry with and cemented to an identically shaped plane metallic disc.

In testimony whereof, I have signed my name to this specification.

MOSES F. CARR.